INVENTORS.
PERCY K. WATSON
HENRY R. TILL

BY Donald C. Kolasch

ATTORNEY

United States Patent Office 3,666,472
Patented May 30, 1972

---

3,666,472
MAGNETIC PHOTO-ELECTROPHORETIC IMAGING COMPOSITION
Henry R. Till and Percy K. Watson, Rochester, N.Y., assignors to Xerox Corporation, Rochester, N.Y.
Filed Oct. 3, 1968, Ser. No. 764,716
Int. Cl. G03c 1/00; B01k 5/00; G03g 5/00
U.S. Cl. 96—88                     3 Claims

ABSTRACT OF THE DISCLOSURE

The subject matter of this application pertains to an electrophoretic imaging system wherein the color quality and image contrast are improved by imparting motion to the imaging suspension before or during the imaging cycle.

Motion may be imparted by applying a magnetic field to an imaging suspension containing magnetic particles. The magnetic composition is also described.

BACKGROUND OF THE INVENTION

This invention relates to an imaging system and, more specifically, to an electrophoretic imaging system.

In photoelectrophoretic imaging, colored photosensitive particles are suspended in an insulating carrier liquid. This suspension is then placed between a pair of electrodes, subjected to a potential difference and exposed to a light image. Ordinarily, in carrying out the process, the imaging suspension is placed on a transparent electrically conductive plate in the form of a thin film and exposure is made through the transparent plate while a second generally cylindrically shaped electrode is rolled across the top of the suspension. The particles are believed to bear an initial charge when suspended in the liquid carrier which causes them to be attracted to the transparent base electrode and, upon exposure, to change polarities by exchanging charge with the base electrode such that the exposed particles then migrate away from the base electrode to the roller electrode thereby forming images on both of the electrodes by particle subtraction, each image being complementary one to the other. The process may be used to produce both polychromatic and monochromatic images. In the latter instance a single color photoresponsive particle may be used in the suspension or a number of differently colored photoresponsive particles may be used in the suspension all of which respond to the same wavelength of light exposure. An extensive and detailed description of the photoelectrophoretic imaging technique as described above is found in U.S. Pat. Nos. 3,384,565, 3,384,566 and 3,383,993.

Although it has generally been found that good quality images can be produced, especially when a relatively insulating "blocking electrode" surface is used in the system, due to the nature of the suspension degrees of difficulty have been encountered in producing high contrast images demonstrating the proper color separation.

SUMMARY OF THE INVENTION

It is, therefore, an object of this invention to provide an imaging system which will overcome the above noted disadvantages.

It is a further object of this invention to provide a high quality electrophoretic imaging system.

Yet, still a further object of this invention is to provide high contrast polychromatic and monochromatic imaging systems.

Another object of this invention is to provide a novel imaging process capable of producing high quality color images.

The foregoing objects and others are accomplished in accordance with the present invention generally speaking by providing a suspension of photoelectrophoretic imaging particles in an insulating carrier liquid. The suspension comprising colored light absorbing particles is placed in an electrode system at least one electrode in the system being transparent and exposed selectively to an electromagnetic radiation source while applying voltage across the imaging suspension. Before or during the imaging phase of the process motion is imparted to the pigment mixture. As a result of particle migration within the system there results a visible image at one or both of the electrodes. The introduction of bulk fluid motion into the imaging process enhances color separation in the polychrome system as well as improving the resulting image contrast. By bulk fluid motion is meant motion generated by an externally applied force.

It has been demonstrated that for proper color separation to be obtained in the above described electrophoretic imaging system it is desirable that considerable movement be introduced into the pigment mixture before or during the imaging phase of the process. It is generally hypothesized that the above mentioned imaging suspension forms a layered structure within the imaging zone. It has been determined that by introducing motion into the system there results a disturbance in the imaging suspension which permits homogeneous mixing of the pigment particles thereby breaking up particle aggregates and enhancing color separation and image contrast. The overall image improvement is believed to take place as a result of the high electric field strength across the suspension in combination with the hydrodynamic forces in the suspension. These forces are present in the form of shear or compressive forces.

The system employs intensely colored pigment particles which serve both as the colorant and as the photosensitive material which apparently undergo a net change in charge polarity upon exposure to activating radiation by interaction with one of the electrodes. No additional photosensitive elements or materials are necessary thus providing a very simple and inexpensive imaging technique. As a result of the mixture of two or more differently colored pigment particles, each of which is sensitive only to light of a specific wavelength, polychromatic images are produced. It has been found that the particles respond in the regions of the spectrum of their principal light absorption, with the cyan, magenta, and yellow particles responding to red, green, and blue light, respectively. Thus the system is most suited to subtractive color synthesis.

While the process of the present invention is especially suitable for enhancing the color separation and image contrast of a polychromatic imaging system, it is likewise suitable for the enhancement of the contrast of images resulting from a monochromatic imaging system. In the latter instance a single color photoresponsive particle may be used in the imaging suspension or a number of differently colored photoresponsive particles may be used, all of which respond to the same wavelength of light exposure.

BRIEF DESCRIPTION OF THE DRAWINGS

The invention is further illustrated in the accompanying drawings wherein.

DETAILED DESCRIPTION

Figure 1:
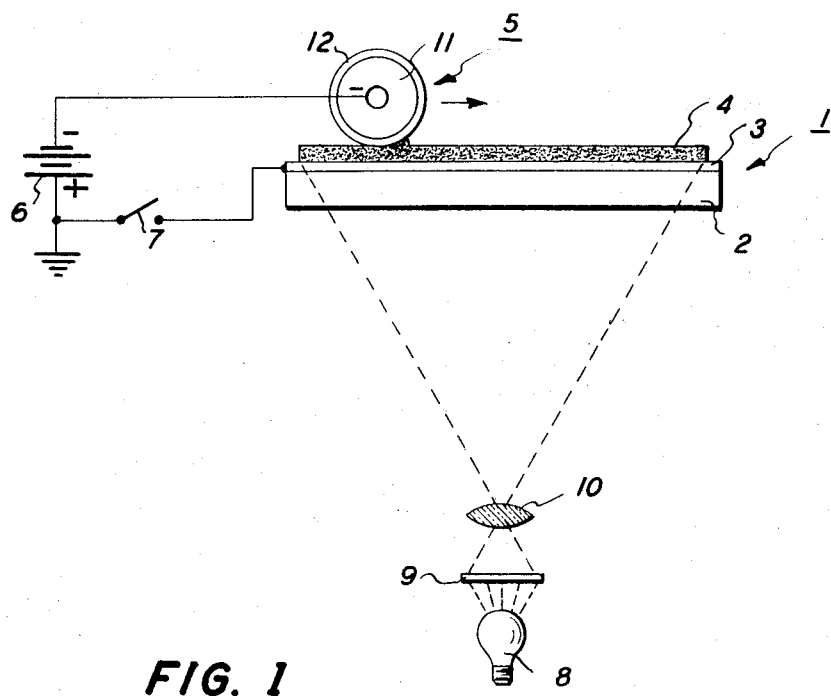
FIG. 1 represents one approach for implementing the process of the present invention.

Referring now to FIG. 1 there is seen a transparent electrode generally designated 1 which in this instance is made up of a layer of optically transparent glass 2 overcoated with a thin optically transparent layer 3 of tin oxide. Tin oxide coated glass of this nature is commercially available under the trade name NESA glass from the Pittsburght Plate Glass Co. This electrode shall hereafter be referred to as the injecting electrode. Coated on the surface of the injecting electrode 1 is a thin layer 4 of the imaging suspension of the present invention comprising finely divided photosensitive pigment particles dispersed in an insulating carrier liquid. The term "photosensitive" for purposes of this application refers to the properties of a particle which, once attracted to the injecting electrode will migrate away from this electrode under the influence of an applied electric field, when exposed to activating radiation. A further detailed explanation of the apparent mechanism of the operation is disclosed in U.S. Pats. 3,384,565, 3,384,566 and 3,383,993, as cited above.

Above the liquid imaging suspension is passed a blocking electrode 5 which in this illustration is represented as a roller having a conductive central core 11 connected to a power source 6. The core in this instance is covered with a layer of blocking electrode material 12 which may, for example, be a material such as baryta paper. The opposite side of potential source 6 is connected to the injecting electrode 1 so that when switch 7 is closed, an electric field is applied across the liquid suspension 4 between electrodes 5 and 1. The pigment suspension is exposed by way of the projector mechanism made up of a light source 8, a transparency 9 and a lens system 10. For purposes of this illustration, a positive color transparency is used during the process. A potential is applied across the blocking and injecting electrodes upon the closing of switch 7. The blocking electrode 5 having a cylindrical configuration in the present illustration is rolled across the top surface of the injecting electrode 1, while exposing the transparency 9 to the imaging suspension 4. Switch 7 is closed during the period of image exposure. The light exposure causes the exposed particle originally attracted to the injecting electrode 1 to migrate through the liquid carrier and adhere to the surface of the blocking electrode material 12 leaving behind an image on the injecting electrode surface which is a duplicate of the original transparency 9. As the blocking electrode passes over the surface of the imaging electrode, the imaging suspension is agitated in the imaging zone thereby imparting motion to the system. The stirring action provided by the agitation of the imaging suspension markedly affects the color separation and ultimately the quality of the color image produced. The resulting image may then be fixed in place as, for example, by placing a lamination over its top surface or by virtue of a dissolved binder material in the carrier liquid, such as paraffin wax or other suitable binders, that comes out of solution as the carrier liquid evaporates.

Figure 2:
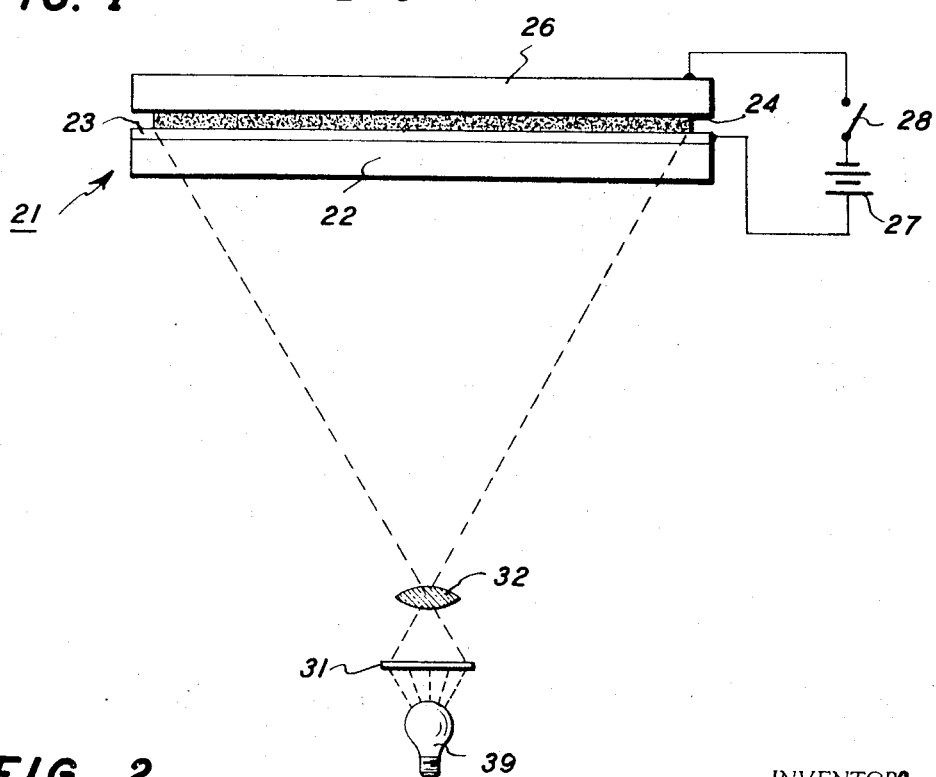
FIG. 2 represents a flat plate apparatus used in conjunction with the present invention.

In FIG. 2 there is seen a transparent injecting electrode generally designated 21 which in the present instance is made up of a layer of optically transparent glass 22 overcoated with a thin optically transparent layer 23 of tin oxide. Coated on the surface of the injecting electrode 21 is a thin layer of the imaging suspension 24 of the present invention. Above the liquid suspension 24 is a blocking electrode 26 which is connected to one side of the potential source 27 by switch 28. The opposite side of the potential source 27 is connected to the injecting electrode 21 so that when switch 28 is closed an electric field is applied across the imaging suspension. As the flat plate blocking electrode is brought down upon the suspension movement is mechanically imparted to the system. Exposure occurs during the period that motion is present in the suspension. An image projector made up of light source 39, transparency 31 and lens 32 is provided to expose the suspension 24 to a light image of the original 31 to be reproduced. It should be noted at this point that the injecting electrode 21 need not necessarily be optically transparent and instead the blocking electrode in a similar manner as that described.

Any suitable and satisfactory technique may be utilized to impart motion to the imaging suspension of the present invention. Various techniques have been demonstrated which provide the necessary stimulus such as the introduction of mechanical vibration by method such as the application of external pressures, magnetically disturbing the suspension, air agitating and electromechanically or mechanically vibrating at least one member of the structure. It has been determined that the most striking effects are realized when the motion is imparted to the system especially within the imaging zone. In a system utilizing a roller electrode, for example, the imaging zone or principal point of imaging occurs in the region just ahead of and including the line of closest approach between the roller and the injecting electrode. In such a system the above discussed electrostatic and hydrodynamic forces attain a maximum value in the zone just ahead of the line of closest approach between the roller electrode and the transparent electrode, in this instance the NESA or injecting electrode.

When used in the course of the present invention the term injecting electrode should be understood to mean that it is an electrode which will preferably be capable of exchanging charge with the photosensitive particles of the imaging suspension when the suspension is exposed to light so as to allow for a net change in the charge polarity of the particles. By the term blocking electrode is meant one which is capable of storing electric charge on its surface, thus it may be thought of as retarding the injection of electric charges into the above mentioned photosensitive particles when the particles come into contact with the surface of the electrode. It is preferred that the injecting electrode be composed of an optically transparent material such as glass overcoated with a conductive material such as tin oxide, copper, copper iodide, gold, or the like; however, other suitable materials including many semiconductive materials such as raw cellophane, which are ordinarily not thought of as conductors but which are still capable of accepting injected charge carriers of the proper polarity under the influence of the applied field, may be used within the course of the present invention. The use of more conductive materials, however, allows for cleaner charge separation and prevents possible charge buildup on the electrode which tends to diminish the interior electrode field. The blocking electrode, on the other hand, is selected so as to prevent or greatly retard the charge exchange of the photosensitive pigment particles when the particles reach the surface of this electrode. The blocking electrode base generally will consist of a material which is fairly high in electrical conductivity. Typical conductive materials are conductive rubber and various metal foils such as steel, aluminum, copper and brass. Preferably the core of the blocking electrode will have a high electrical conductivity in order to establish the required polarity differential. However, if a low conductivity material is used a separate electrical connection may be made to the back of the blocking layer of the electrode. Although a blocking electrode material may not necessarily be used in the system, the use of such a layer is preferred because of the markedly improved results which it is capable of producing. It is preferred that the blocking layer when used be either an insulator or a semiconductor which will not allow for the passage of sufficient charge carriers under the influence of the applied field to discharge the particle finally bound to its surface thereby preventing particle oscillation within the system. Although the blocking electrode does allow for passage of some charge carriers it would still be considered to come within the class of preferred materials if it does not allow for the passage of sufficient carrier to recharge the majority of pigment particles to the opposite polarity. Exemplary of the preferred blocking layer materials used are baryta paper which consists of paper coated with barium sulfate suspended in a gelatin solution, Tedlar, a polyvinyl fluoride commercially available from E. I. du Pont de Nemours & Co., Inc. and polyurethane. Any other suitable materials having a resistivity of about $10^7$ ohm-cm. or greater may be employed as the blocking electrode material. Typical materials in this resistivity range include cellulose acetate coated papers, polystyrene, polytetrafluoroethylene and polyethylene terephthalate. The baryta paper, Tedlar, and the other suitable materials used as the blocking layer, when utilized, may be a separate replaceable layer which is either taped to the blocking electrode or held by mechanical fasteners or any other device which is capable of simply holding the layer on the electrode. In the alternative, the layer may be an integral part of the electrode itself, being either adhesively bonded, laminated, spray coated or otherwise applied to the surface of the electrode.

Any suitable insulating carrier liquid may be used in the course of the present invention. Typical materials found suitable include decane, dodecane, and tetradecane, molten paraffin wax, molten beeswax, and other molten thermoplastic materials, Sohio Odorless Solvent, a kerosene fraction commercially available from Standard Oil Co. of Ohio, and Isopar G, a long chain saturated aliphatic hydrocarbon commercially available from Humble Oil Co. of New Jersey and mixtures thereof.

A wide range of voltages may be applied between the electrodes in the system. For good image resolution, high image density and low background it is preferred that the potential applied be such as to create an electric field whose maximum value is at least 300 volts per mil across the imaging suspension. The applied potential necessary to attain this field of strength will, of course, vary depending upon the inter-electrode gap and upon the thickness and type of blocking material used on the blocking electrode surface. For high image quality, the applied voltage may be, for example, 5,000 volts across the configuration. The upper limit of field strength is limited only by the electrical conduction of the suspension and the dielectric properties of the blocking material.

In the polychromatic system, the particles are selected so that those of different colors respond to different wavelengths in the visible spectrum corresponding to their principal absorption and further so that their spectral response curves do not have substantial overlap; thus allowing for color separation and subtractive multicolor image formation. Several different particles are employed namely a cyan colored particle sensitive mainly to red light, a magenta colored particle sensitive mainly to green light and a yellow colored particle sensitive mainly to blue light. While this is the simplest combination, additional particles having different absorption maxima may be added to improve color synthesis. When mixed together in the carrier liquid, these particles produce a substantially black liquid and when one or more of the particles are caused to migrate from the injecting electrode to the blocking electrode they leave behind particles which produce a color equivalent to the color of the impinging light source. Thus, for example, red light exposure causes the cyan colored pigment to migrate thereby leaving behind the magenta and yellow pigments which combine to produce red in the final image. In the same manner, blue and green color light is reproduced by removal of yellow and magenta pigments respectively and, of course, when white light impinges upon the mix all pigments migrate leaving behind the color of the white or transparent substrate. A dark exposure leaves behind all pigments which combine to produce a black image. It should be recognized that this is an ideal technique for subtractive color imaging in that the particles are not only each composed of but one component but in addition they perform a dual function in that they act both as the final image colorant and the photosensitive medium of the system. Accordingly, the system represents virtually the ultimate in eliminating the complexity of prior art methods of subtractive color imaging.

It is desirable to use pigment particles which are relatively small in size because smaller particles produce better and more stable pigment dispersions in the liquid carrier and in addition are capable of producing images of higher resolution then is the case with particles of larger sizes. Even where the pigments are not commercially available in small particle sizes the particle size may be reduced by conventional techniques such as ball milling or the like. When the particles are suspended in the liquid carrier they may take on a net electrostatic charge, and, as a result, may be attracted towards one of the electrodes in the system depending upon the polarity of the charge with respect to that of the electrodes. It is not necessary that the particles taken on only one polarity of charge but instead particles of both polarities may be present, so that particles are attracted to both electrodes. Some of the particles in the suspension initially move towards the injecting electrode while others move towards the blocking electrode with this type of system; however, this particle migration takes place uniformly over the entire area covered by the two electrodes and the effect of imagewise, exposure-induced migration is superimposed upon it. Thus, the apparent bipolarity of these suspensions in no way affects the imaging capability of the system except for the fact that it subtracts some of the particles uniformly from the imaging suspension before imagewise modulation of the particle migration takes place. In other words, the above behavior causes a portion of the suspended particles to be removed from the system as potential image formers. The effect of subtraction of some of these particles as potential image formers in the system is easily overcome by merely forming an initial suspension of particles contained in a sufficiently high particle concentration such that the system is still capable of producing intense images. Also, it has been found that with some suspensions of this type, either polarity of potential may be applied to the electrodes during imaging.

Any suitable different colored photosensitive pigment particles having the desired spectral responses such as disclosed in U.S. Pat. 3,384,488 may be used to form the pigment mix of the present invention. The photosensitive pigment may, for example, be polymeric in nature. The percentage of pigment in the insulating liquid carrier is not considered critical; however, for reference purposes, it is noted that from about 2 to about 10 percent pigment by weight has been found to produce desirable and acceptable results. Although various electrode spacings may be employed, a spacing of less than about 1 mil and extending down to the point where the electrodes are pressed together, constitutes a particularly preferred form of the invention.

As previously stated, once the particle image is formed it may be fixed to the respective electrode such as by spraying a binder onto the surface, by laminating an overlay over the imaged surface by including a binder in the liquid suspension medium. Generally, it will be found preferable to transfer the image from the electrode and fix it on a secondary surface so that the electrode may be reused. Such a transfer step may be carried out by an adhesive pickoff technique such as with adhesive tape or preferably by electrostatic field transfer. Electrostatic transfer may, for example, be executed by carrying out the imaging procedure described in connection with the above illustration and then passing a second roller over the particle image formed on the injecting electrode, the second roller being held at a potential opposite in polarity to that of the first electrode which was initially passed across the surface of the injecting electrode. If the second electrode roller is covered with a baryta paper sleeve, this paper sleeve will pick up the complete image as the electrode passes across the surface thereof.

PREFERRED EMBODIMENTS

To further define the specifics of the present invention the following examples are intended to illustrate and not limit the subject matter of the present invention. Parts and percentages are by weight unless otherwise indicated.

The examples are carried out utilizing an apparatus of the general type illustrated in FIGS. 1 and 2 with the imaging mix coated on a NESA glass substrate through which exposure is made. The NESA glass surface is connected in series with a switch, a potential source, and the conductive portion of the roller or plate. A coating of baryta paper is utilized as the blocking material on the respective surface. The roller is approximately 2½ inches in diameter and is moved across the plate surface at about 1 inch per second. The NESA plate employed is roughly 3 inches square and is exposed with a light intensity of about 1800 foot-candles. The blocking electrode plate in Example II is a conductive plate of generally the same dimensions as the NESA plate. Exposure is made with a 3200° K. lamp through a Kodachrome transparency which is placed between the white light source and the NESA glass substrate.

EXAMPLE I

An imaging suspension comprising equal amounts of Watchung Red B, a barium salt of 1-(4'-methyl-5'-chloroazobenzene-2'-sulfonic acid)-2-hydroxy-3-naphthoic acid, C.I. No. 15865, Monolite Fast Blue, a form of metal free phthalocyanine and a yellow pigment Algol Yellow, 1,2,5,6-di(C,C'-diphenyl) thiazole anthraquinone in mineral oil is prepared with the total pigment constituting about 8 percent by weight of the suspension. These pigments are magenta, cyan and yellow respectively. The resulting mixture is coated on a NESA glass substrate and exposed as discussed above with a photographic positive transparency projected onto the tri-mix. During the period of image exposure a roller electrode, as described above, is passed across the suspension coated surface of the NESA glass. The roller electrode is held at a negative potential of about 2500 volts with respect to the NESA glass substrate. During the period of image exposure the roller electrode is electromechanically vibrated. The cycle is repeated 6 times with the surface of the blocking roller being cleaned after each pass. Potential application and exposure are both continued during the entire process. A positive color image is reproduced on the surface of the NESA electrode.

EXAMPLE II

An imaging suspension similar to that described in Example I with the pigment constituting about 5 percent of the suspension is coated on a NESA glass substrate and exposed as discussed such that a positive color image is projected onto the tri-mix as a second blocking electrode in the form of a plate is brought down on top of the imaging suspension. A pressure of about 2 pounds per square inch is placed on the suspension mix. The blocking electrode plate is held at a negative potential of about 2500 volts with respect to the NESA glass substrate and is held in this position for about 2 seconds. While the field is still applied the plates are separated and then the field cut off. A resulting color image is seen on the surface of a NESA electrode.

EXAMPLE III

An imaging suspension comprising equal amounts of Bonadur Red B, 1-(4'-chloro-5'-ethyl-2'-sulfonic acid) azobenzene-2-hydroxy - 3 - naphthoic acid, commercially available from American Cyanamide, Monolite Fast Blue and a proprietary yellow pigment N-2"-pyridyl-8,13, diazodinaphtho-(2,1-6;2'3'-d) furan-6-carboxamide, more fully defined in the U.S. Pat. 3,447,922 having a common assignee, is prepared in a Sohio Solvent 3440, available from Standard Oil of Ohio, with the total pigment constituting about 10 percent by weight of the suspension. To the tri-mix are added magnetic ferric oxide particles about 10 microns in size so as to constitute about 1 percent of the total weight of the suspension. The resulting mixture is coated on a NESA glass substrate and exposed as discussed above such that a positive color image is projected onto the tri-mix as a second blocking electrode roller is passed over the upper surface of the suspension coated injecting electrode. A magnetic field is applied to the suspension during the exposure phase of the process whereby the magnetic particles are made to oscillate thereby imparting motion to the imaging suspension during imaging. A positive color reproduction of the image input is formed on the surface of the injecting electrode. The image produced is then pressure transferred to the surface of a paper receiver sheet.

EXAMPLE IV

An imaging suspension comprising a metal-free phthalocyanine pigment, Monolite Fast Blue G.S. is prepared, 7 parts by weight of the photosensitive particles being dispersed in mineral oil. The imaging suspension containing the phthalocyanine pigment is coated on a NESA glass substrate and exposed as discussed above. During imaging the blocking electrode roller is held at a negative potential of about 2500 volts with respect to the NESA glass. During exposure the blocking electrode is electromechanically vibrated as in Example I. Inasmuch as the imaging suspension contains a single pigment, the resulting image produced demonstrates the high image contrast capability of the present invention in a monochrome process.

EXAMPLE V

An imaging suspension comprising equal amounts of Watchung Red B, Monolite Fast Blue and Algol Yellow in mineral oil is prepared with the total pigment constituting about 7 percent by weight of the suspension. These pigments are magenta, cyan and yellow respectively. The resulting mixture is coated on a NESA glass substrate and a second blocking electrode plate brought down on top of the suspension. The suspension is exposed as discussed in Example I. A negative potential of about 2500 volts is applied to the blocking electrode with respect to the NESA electrode. During the period of image exposure the flat plate blocking electrode is mechanically vibrated. A positive color image is reproduced on the surface of the NESA electrode.

Although the present examples were specific in terms of conditions and materials used, any of the above mentioned materials may be substituted when applicable with similar results being obtained. In addition to the steps used in the process of the present invention, other steps or modifications may be used, if desirable. For example, several forms of agitation may be used in the same system. In addition, other materials may be incorporated in the imaging suspension and other facets of the invention which will enhance, synergize or otherwise desirably affect the properties therein desired. For example, various sensitizers may be utilized in conjunction with the imaging suspension.

Anyone skilled in the art will have other modifications occur to them based on the teachings of the present invention. These modifications are intended to be encompassed within the scope of this invention.

What is claimed is:

1. A photoelectrophoretic imaging composition comprising a plurality of at least two differently colored finely divided particles in a carrier liquid, each of said particles comprising an electrically photosensitive pigment, the principal light absorption band of which substantially coincides with its principal photosensitive response, said pigment being both the primary electrically photosensitive ingredient and the primary colorant for said particle and, in addition, a plurality of finely divided magnetic particles.

2. The composition as disclosed in claim 1 wherein said composition comprises cyan colored particles which are principally photosensitive to red light, magneta colored particles which are principally photosensitive to green light and yellow colored particles which are principally photosensitive to blue light.

3. A photoelectrophoretic imaging composition consisting of a plurality of finely divided particles in an insulating carrier liquid, each of said particles comprising an electrically photosensitive pigment which is both the primary electrically photosensitive ingredient and the primary colorant for said particle, and a plurality of magnetic particles in addition to said photosensitive particles.

References Cited

UNITED STATES PATENTS

| | | | |
|---|---|---|---|
| 2,878,135 | 3/1959 | Willis | 106—308 |
| 2,544,391 | 3/1951 | Marling | 106—14 |
| 3,384,488 | 5/1968 | Tulagin et al. | 96—88 |
| 3,384,566 | 5/1968 | Clark | 204—181 |
| 3,427,242 | 2/1969 | Mihajlov | 204—300 |
| 3,474,019 | 10/1969 | Krieger et al. | 204—181 |

GEORGE F. LESMES, Primary Examiner

J. C. COOPER III, Assistant Examiner

U.S. Cl. X.R.

96—1 R, 1.2, 1.5; 106—304; 117—235; 252—62.1, 62.51, 62.52, 62.56; 204—180, 181